United States Patent Office 2,704,807
Patented Mar. 22, 1955

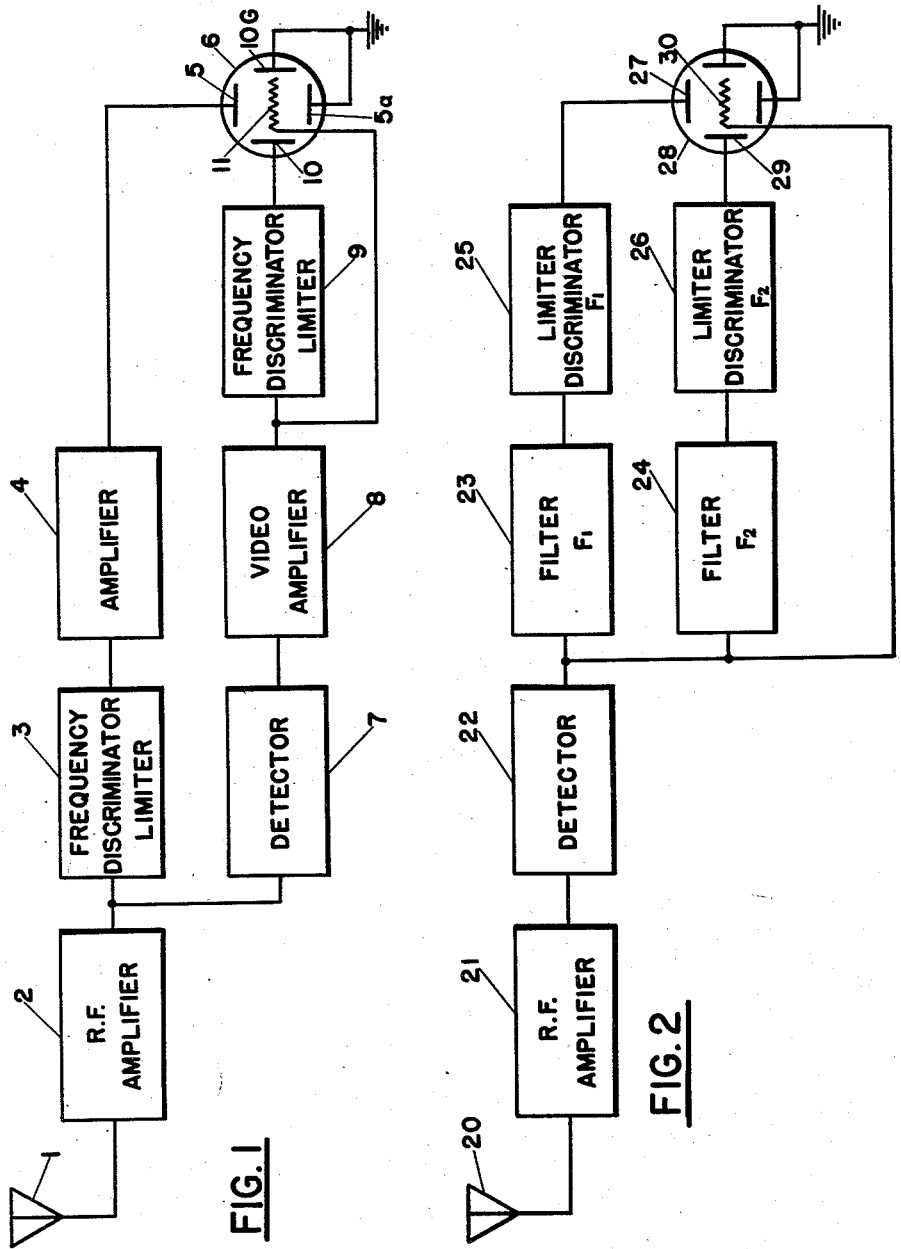

2,704,807

PANORAMIC DEVICES

Marcel Wallace, Fairfield County, Conn., assignor, by mesne assignments, of one-half to said Wallace, doing business as Panoramic Laboratories, East Port Chester, Conn.

Application May 7, 1946, Serial No. 667,770

12 Claims. (Cl. 250—20)

This invention relates generally to panoramic devices and particularly to panoramic devices operable to analyze a pair of signal frequencies for simultaneous indication thereof.

In general, I propose to transmit pulsed carrier signals the frequencies of which may be significant of the magnitudes of a given quantity, a modulation frequency associated with each said carrier signal being significant of a further magnitude of still another quantity.

For example, I may transmit from each of a plurality of aircraft a pulsed signal the frequency of which may be representative of the altitude of the aircraft, the signal being modulated with a further signal representative of the geographical location of the aircraft, or of the relation of the aircraft to a predetermined course, or of the direction of flight of the aircraft.

Alternatively, I propose to transmit pulsed carrier signals of constant and fixed frequency and to modulate the carriers each with a pair of discrete signals of different separable frequencies, the values of the said frequencies being representative respectively of an associated pair of magnitudes, such as, for example, altitude and location, altitude and direction, or location and direction.

The transmitted signals of alternative character above described may be received and translated in suitable apparatus to provide a simultaneous and continuous indication of the value of each pair of magnitudes, a plurality of such pairs of magnitudes being simultaneously indicatable on a single indicator, such as a cathode ray indicator.

While panoramic receivers of various character, for accomplishing objectives similar to those above recited, have been disclosed in certain copending applications for United States patent filed in the name of Marcel Wallace, and particularly Serial #663,311, filed April 19, 1946, and entitled "Navigational Systems," Serial #663,313, filed April 19, 1946, and entitled "Panoramic Devices," and Serial #670,892, filed May 20, 1946, and entitled "Receiver Indicators," I propose in the present application to disclose a panoramic device of novel design and character, and operating upon a novel principle for indicating signals of the character above described.

It is an object of my invention to provide panoramic devices for indicating simultaneously the values of a pair of quantities each represented in terms of a frequency, without requiring scanning mechanisms.

It is a further object of my invention to provide panoramic devices for indicating simultaneously on the face of a cathode ray indicator the simultaneous values of a plurality of signals, each of information significant carrier frequency and modulation frequency, and each indication providing simultaneous information of the significance of each carrier and its associated modulation frequency, such indications being provided without the necessity for scanning mechanism.

It is still another object of my invention to provide panoramic devices for indicating simultaneously on the face of a cathode ray tube indicator the simultaneous values of a plurality of modulation frequency pairs, each frequency of each pair of frequencies being information significant and the total information inherent in each pair of frequencies being indicated as a unitary indication.

The above and still further objects of my invention will be clarified upon study of the following detailed description of various embodiments of my invention when taken in conjunction with the accompanying drawings, wherein:

Figure 1 is a schematic block diagram of an embodiment of my invention, for receiving and pulsed analyzing a plurality of frequency controlled carriers, each modulated by a frequency controlled modulating signal; and Figure 2 is a schematic block diagram of a further embodiment of my invention, for receiving and analyzing a plurality of pulsed carrier signals each modulated by a pair of frequency controlled modulating signals.

Referring now to the drawings, and particularly to Figure 1 thereof, there is illustrated a receiver having an antenna 1, an R. F. amplifier 2, a frequency discriminator 3 connected to the output of the R. F. amplifier 2 and serving to produce an output voltage having a polarity and a magnitude depending upon the sense and extent of deviation of the frequency of a received carrier from the frequency to which the discriminator 3 may be tuned. The output voltage derived from the amplifier 4 may be applied as a deflecting voltage to a vertical plate 5 of the cathode ray indicator 6, the opposing vertical plate being grounded.

The output of the R. F. amplifier 2 is further applied to a detector 7 for detection therein of the modulation signal carried by the modulated signal carrier intercepted by the antenna 1. The detected output of the detector 7 may be amplified in a suitable video amplifier 8, and thereafter applied to a discriminator-circuit 9, the output of the discriminator 9 being a D. C. voltage of a polarity and magnitude dependent upon the extent and sense of deviation of the modulation signals from the center frequency of the discriminator 9. Each of the discriminators 3 and 9 may include a limiter, if desired, which serves to limit the amplitude of the signal imput to its associated discriminator, to assure that the output of the discriminator is representative of frequency only and is unaffected by the amplitude values of the discriminated signals. The application of limiting techniques to the art of frequency detection is well known, and requires no further comment.

The output voltage of the frequency discriminator 9 is applied to a horizontal plate 10 of the indicator 6, the opposite horizontal plate 10G being grounded.

Simultaneously with the application of deflecting voltage to the plates 5 and 10, a suitable intensifying voltage derivable from the output of the video amplifier 8 may be applied to the intensity grid 11, which in the absence of signals is biased to cut-off and prevents generation of visual signals on the face of the cathode ray indicator 6.

It will now be clear that upon receipt of pulsed signals from a plurality of transmitters, each of which transmits on an information significant carrier frequency modulated with an information significant modulation frequency, and assuming that the pulses from each transmitter are produced at random with respect to the pulses from any other similar transmitter, that the information provided by the transmissions from the various transmitters may be received at haphazard moments, and that each received pulse will produce on the face of the indicator a dot indication representative in vertical position of the carrier frequency and in horizontal position of the modulation frequency associated with that carrier.

At random moments pulses from a plurality of transmitters will arrive simultaneously at the antenna 1, in which case a transient erroneous indication will occur. Such indications are, of course, readily discriminated from the steady desired indications, by any observer, because of their transient and random character, the desired signals providing a steady bright spot at a relatively fixed location.

In order to assure a minimum of erroneous signals, I prefer to operate my novel receiver in conjunction with pulse transmission having a short duty cycle, i. e., relatively short pulses spaced at widely separated intervals.

Reference is now made to Figure 2 of the drawings, wherein is illustrated a variation of the embodiment of my invention illustrated in Figure 1 of the drawings and heretofore described.

The receiver of Figure 2 is intended to operate in conjunction with a plurality of random pulse transmissions, each of which may be at the same carrier frequency, each transmission, however, being modulated with a pair of modulation frequencies each of which has a value dependent upon the magnitude of a measurable quantity, or being otherwise information significant, and the frequencies being sufficiently different to permit separation thereof by conventional filtering techniques.

Upon interception by the antenna 20 of a pulse signal comprised in any of the plurality of transmissions, at a given carrier frequency, the pulse carrier signal is amplified in the R. F. amplifier 21, and detected in the detector 22, to abstract from the carrier signal the pulse envelope, including the pair of modulation signals associated with the pulse carrier. The modulation signals are separated by suitable filters 23 and 24, the former being designed and adjusted to pass only frequencies within a first given band, occupied by signals of one modulation frequency $F_1$, and the other being designed and adjusted to pass only frequencies within a second selected band, which is occupied by signals of the second modulation frequency $F_2$.

Signals of frequency $F_1$ may be limited in amplitude and thereafter frequency detected in the limited-frequency discriminator 25. Signals of frequency $F_2$ may be likewise limited and frequency detected in a second limited-frequency discriminator 26, it being understood that the discriminator 25 may be tuned to a frequency mid-way of the band of frequencies occupyable by modulation signals $F_1$ and that discriminator 26 may be tuned to a different frequency midway of the band of frequencies occupyable by the modulation signals $F_2$, the two bands of frequencies being relatively widely separated to assure completeness of filtering.

The D. C. output of the discriminator 25 may be applied to a vertical plate 27 of a cathode ray indicator 28, and the D. C. output of the discriminator 26 to a horizontal plate 29 of the indicator 28, the remaining deflecting plates being grounded.

Signals available at the output of the detector 22 may be applied to intensifier grid 30, the latter being normally de-intensified or biased back sufficiently to prevent visible indications on the face of the indicator in the absence of signals.

It will now be clear that each received signal input pulse will cause intensification and hence a visible indication, the position of the indication on the face of the indicator 28 being dependent upon the values of the frequencies $F_1$ and $F_2$, or more accurately, to the positions which are occupied by the frequencies $F_1$ and $F_2$ in the discrimination range of the discriminators 25 and 26.

It will be true, because of the random and unrelated timing of received pulses from a plurality of independent transmitters, that superposed pulses from a plurality of transmitters will be received occasionally. Such occurrences, however, will occur at random and while they will provide transient indications of no significance, such signals will be readily recognizable as to their character and will occasion no difficulty, precisely because of their transient and random occurrence, the desired signals being steady and considerably brighter than the undesired signals.

While I have described and illustrated two specific embodiments of my invention, various modifications thereof may obviously be resorted to, in respect to general arrangement of the combination, as well as in choice of component elements thereof, without departing from the spirit of the invention as defined in the appended claims.

What I claim and desire to secure by Letters Patent of the United States is:

1. In combination, means for receiving pulsed and modulated carrier signals, means for measuring the frequency of each carrier pulse, means for demodulating each carrier pulse to derive a modulation signal therefrom, means for measuring the frequency of each modulation signal, and means responsive to both measuring means for providing a unitary indication of the values of said frequencies in response to each pulse.

2. In combination, a signal receiver for receiving a signal having a carrier frequency and a modulation frequency, a frequency discriminator for providing a voltage proportional to the carrier frequency of said signal, means for deriving from said signal a further signal at said modulation frequency, a frequency discriminator for providing a voltage proportional to the frequency of said further signal, a cathode ray tube indicator having a first and a second beam deflection electrode, means for applying one of said voltages to said first beam deflection electrode and means for applying the other of said voltages to the second beam deflection electrode.

3. In combination, a signal receiver for receiving a carrier modulated with a pair of distinct modulating frequencies, means for detecting said modulating frequencies, means for separating said modulating frequencies, a first frequency discriminator for one of said modulating frequencies, a second frequency discriminator for the other of said modulating frequencies, means for applying one of the separated modulating frequencies to said first discriminator, means for applying the other of said separated modulating frequencies to said second discriminator, a cathode ray tube indicator having a cathode ray beam, means responsive to a voltage output of said first discriminator for deflecting said cathode ray beam, and means responsive to a voltage output of said second discriminator for simultaneously further deflecting said cathode ray beam.

4. A signal analyzer comprising a source of alternating current signal to be analyzed, a limiter for limiting the amplitude of said signal to a predetermined value, a frequency discriminator coupled to the output of said limiter for developing a voltage proportional to the frequency of said signal, a cathode ray tube indicator having a beam deflection electrode, means for applying said voltage to said electrode, means normally maintaining said beam at low intensity, and means responsive to said signal for intensifying said beam.

5. A signal analyzer comprising a source of alternating current signal to be analyzed, said signal having two frequency components, means for separating said frequency components in separate channels, means for limiting the amplitude of each of said components, frequency discriminator means for developing a voltage having a magnitude which is a function of the frequency of one of said components, further frequency discriminator means for developing a further voltage having a magnitude which is a function of the frequency of the other of said components, a cathode ray tube indicator having two beam deflecting elements, means for applying said voltage to one of said elements, means for applying said further voltage to the other of said elements, means normally maintaining said beam at low intensity, and means responsive to said signal for intensifying said beam.

6. A source of repetitive time separated radio frequency pulse signals, selected ones of said pulse signals having carrier frequencies different from others of said pulse signals, means for equalizing the amplitudes of all said pulse signals, a frequency selective circuit responsive to each of said pulse signals and providing a response to each of said pulse signals which is a function of the frequency of said pulse signals, a cathode ray tube, means responsive to said responses for deflecting the beam of said cathode ray tube, means normally maintaining said beam at relatively low intensity, and means responsive to each of said pulse signals for intensifying said beam.

7. A source of repetitive time separated radio frequency pulse signals, each of said pulse signals comprising a pair of frequency components, different ones of said pulse signals having different values of frequency of one or both of said frequency components, means for equalizing the amplitudes of all of said frequency components, a first frequency discriminator for predetermined ones of said frequency components, a further frequency discriminator for the remainder of said frequency components, a cathode ray tube indicator having a pair of beam deflection elements, means for applying the output of said first frequency discriminator to one of said pair of beam deflection elements, means for applying the output of said further frequency discriminator to the other of said pair of beam deflection electrodes, means normally maintaining said beam at low intensity, and means responsive to each of said pulse signals for intensifying said beam.

8. A signal analyzer, comprising, a source of pulsed carriers the frequencies of which are to be analyzed, means responsive to said pulsed carriers and coupled to said source for developing pulse voltages dependent each only on the frequency of one of said pulsed carriers, a cathode ray tube indicator having means for generating a beam of electrons and means for deflecting said beam of electrons, means for applying said voltages to said means for deflecting, means normally maintaining said beam at relatively low intensity, and means responsive to each of said pulsed carriers for intensifying said beam.

9. In combination, means for receiving pulsed and modulated carrier signals, means for measuring the carrier frequency of each carrier pulse, means for demodulating each carrier pulse to derive a modulation signal therefrom, means for measuring the frequency of each modulation signal, means responsive to both measuring means for providing a unitary indication of the values of said frequencies in response to each pulse, said means for measuring including a limiter and a frequency discriminator connected in cascade.

10. The combination in accordance with claim 9 wherein each measuring means is a limiter and a frequency discriminator connected in cascade.

11. The combination in accordance with claim 9 wherein said means for providing a unitary indication is a cathode ray tube indicator.

12. In combination, means for receiving pulse signals each comprising distinct frequencies, means for measuring simultaneously each distinct frequency of said distinct frequencies associated with a selected pulse signal, said means for measuring including an amplitude limiter and a frequency discriminator connected in cascade, a cathode ray indicator having deflecting means, and means responsive to said means for measuring for controlling said deflecting means, said deflecting means comprising two sets of deflection devices, each set of deflection devices being coupled to a distinct one of said frequency discriminators in responsive relation thereto.

References Cited in the file of this patent

UNITED STATES PATENTS

| | | |
|---|---|---|
| 1,604,610 | Schelleng | Oct. 26, 1926 |
| 1,831,881 | Potter | Nov. 17, 1931 |
| 2,094,472 | Rohats | Sept. 28, 1937 |
| 2,189,848 | Wheeler | Feb. 13, 1940 |
| 2,194,516 | Anderson | Mar. 26, 1940 |
| 2,215,197 | Sherman | Sept. 17, 1940 |
| 2,269,126 | Pieracci | Jan. 6, 1942 |
| 2,304,635 | Ferguson | Dec. 8, 1942 |
| 2,354,032 | Lyman | July 18, 1944 |
| 2,361,437 | Trevor | Oct. 31, 1944 |
| 2,369,011 | Braden | Feb. 6, 1945 |
| 2,404,501 | Kear | July 23, 1946 |
| 2,406,858 | Shepherd et al. | Sept. 3, 1946 |
| 2,408,742 | Eaton | Oct. 8, 1946 |
| 2,409,462 | Zworykin et al. | Oct. 15, 1946 |
| 2,416,346 | Potter | Feb. 25, 1947 |
| 2,433,804 | Wolff | Dec. 30, 1947 |